(12) United States Patent
Skovholt

(10) Patent No.: US 9,724,623 B2
(45) Date of Patent: Aug. 8, 2017

(54) INCLINED TUBULAR SEPARATOR FOR SEPARATING OIL WELL SUBSTANCES

(71) Applicant: Seabed Separation AS, Trondheim (NO)

(72) Inventor: Otto Skovholt, Trondheim (NO)

(73) Assignee: Seabed Separation AS, Trondheim (NO)

( * ) Notice: Subject to any disclaimer, the term of this patent is extended or adjusted under 35 U.S.C. 154(b) by 70 days.

(21) Appl. No.: 14/654,233

(22) PCT Filed: Dec. 20, 2013

(86) PCT No.: PCT/EP2013/077627
§ 371 (c)(1),
(2) Date: Jun. 19, 2015

(87) PCT Pub. No.: WO2014/096330
PCT Pub. Date: Jun. 26, 2014

(65) Prior Publication Data
US 2015/0343328 A1 Dec. 3, 2015

(30) Foreign Application Priority Data
Dec. 21, 2012 (EP) .................................. 12198846

(51) Int. Cl.
*B01D 17/025* (2006.01)
*B01D 17/02* (2006.01)
(Continued)

(52) U.S. Cl.
CPC ......... *B01D 17/02* (2013.01); *B01D 17/0208* (2013.01); *B01D 17/0214* (2013.01);
(Continued)

(58) Field of Classification Search
CPC ............ B01D 17/0208; B01D 17/0214; B01D 19/0068; B01D 19/0073; B01D 19/0078;
(Continued)

(56) References Cited

U.S. PATENT DOCUMENTS

| 739,809 | A | * | 9/1903 | Baker | B01D 35/02 |
| | | | | | 210/519 |
| 1,494,670 | A | * | 5/1924 | Delaney | E21B 43/34 |
| | | | | | 210/538 |

(Continued)

FOREIGN PATENT DOCUMENTS

| DE | 10352038 | * | 6/2005 |
| EP | 0266348 | | 5/1988 |

(Continued)

OTHER PUBLICATIONS

International Search Report and Written Opinion dated Mar. 21, 2014 (PCT/EP2013/077627).
Written Opinion dated Jan. 23, 2015 (PCT/EP2013/077627).

*Primary Examiner* — Christopher Upton
(74) *Attorney, Agent, or Firm* — Alix, Yale & Ristas, LLP

(57) ABSTRACT

The present invention relates to a tubular oil separator providing separation of respective fluid components mixed in fluids from oil wells, wherein the tubular oil separator A is arranged to mitigate problems related to turbulence and possible non-Newtonian fluid behaviors of fluid components mixed in the fluids from the oil wells in the oil separator. The invention further relates to a method of operating a separator. Moreover the invention relates to a system of multiple separators. Inventive aspects of the separator comprises an elongated outer, closed tubular section and an elongated, inner tubular section, which is closed in one end and open in another end, —where the inner tubular section is arranged inside the outer tubular section, —and where oil well
(Continued)

substances are introduced into the open end of the inner tubular section via a tube feed section passing through the outer tubular section and into the inner tubular section, —and where the inner tubular section comprises multiple, elongated and parallel slots arranged in a longitudinal direction of the inner tubular section in a circumferential manner, —where the inclination of the separator facilitates separation of the oil well substances into lower density substances and higher density substances, —where the lower density substances by buoyancy drift upward through the slots and exit via an upper outlet in the outer tubular section and higher density substances sink downward through the slots and by gravitation exit via a lower outlet in the outer tubular section.

21 Claims, 9 Drawing Sheets

(51) Int. Cl.
  *B01D 19/00* (2006.01)
  *B01D 21/24* (2006.01)
  *B01D 21/28* (2006.01)
  *E21B 43/34* (2006.01)
(52) U.S. Cl.
  CPC ..... *B01D 17/0217* (2013.01); *B01D 19/0068* (2013.01); *B01D 19/0073* (2013.01); *B01D 19/0078* (2013.01); *B01D 21/2416* (2013.01); *B01D 21/2422* (2013.01); *B01D 21/283* (2013.01); *E21B 43/34* (2013.01); *Y10T 29/49766* (2015.01)
(58) Field of Classification Search
  CPC ............ B01D 21/2416; B01D 21/2422; B01D 21/283; E21B 43/34
  USPC ....... 210/801, 519, 532.1, 538, 540; 96/184; 166/75.12, 267
  See application file for complete search history.

(56) References Cited

U.S. PATENT DOCUMENTS

| | | | | |
|---|---|---|---|---|
| 2,355,305 | A * | 8/1944 | Koenig | B01D 21/2416 210/519 |
| 2,531,547 | A * | 11/1950 | Ayres | B01D 11/0473 210/519 |
| 3,814,262 | A * | 6/1974 | Nolley, Jr. | B01D 17/0208 210/519 |
| 4,483,695 | A * | 11/1984 | Covey, Jr. | B01D 19/0078 210/540 |
| 5,837,152 | A | 11/1998 | Komistek et al. | |
| 6,983,852 | B2 * | 1/2006 | Hemstock | E21B 43/34 210/519 |
| 7,611,635 | B2 * | 11/2009 | Chieng | B01D 17/0214 96/184 |
| 8,002,121 | B2 | 8/2011 | Berard et al. | |
| 2006/0000608 | A1 | 1/2006 | Surjaatmadja et al. | |
| 2011/0266228 | A1 * | 11/2011 | Brown | E21B 43/34 210/801 |
| 2012/0152864 | A1 * | 6/2012 | Sowerby | B01D 17/0214 210/533 |
| 2013/0083620 | A1 * | 4/2013 | Hypes | B01D 17/0214 366/136 |
| 2015/0343327 | A1 * | 12/2015 | Skovholt | B01D 17/0214 29/407.01 |

FOREIGN PATENT DOCUMENTS

| | | |
|---|---|---|
| GB | 2374620 | 10/2002 |
| WO | 0201044 | 1/2002 |

* cited by examiner

INCLINED TUBULAR SEPARATOR FOR SEPARATING OIL WELL SUBSTANCES

FIELD OF THE INVENTION

The present invention relates to a tubular oil separator providing separation of respective fluid components mixed in fluids from oil wells, wherein the tubular oil separator is arranged to mitigate problems related to turbulence and possible non-Newtonian fluid behaviors of fluid components mixed in the fluids from the oil wells in the oil separator. The invention further relates to a method of operating a separator. Moreover the invention relates to a system of multiple separators.

BACKGROUND OF THE INVENTION

Fluids being produced from oil wells may comprise a mixture of fluid components like oil, water, gas, and sand etc., which are commonly referred to as fluid phases, where the percentage fraction of each respective fluid component may vary from one oil field to another, and also during the operational lifetime of a same oil well. It is for example common to have an increase in water content from oil wells towards the end of the production life time of an oil well.

Separation of fluid components may be necessary to be able to provide further processing of the oil and gas in a refinery for example. However, the requirement of providing separation is not always a specific requirement. Sometimes it is only necessary to separate water from the oil, either as a course separation process, or with a higher demand on separation results and/or efficiency.

There are some proposals for separators in known art providing separation of water from fluids being produced from oil wells. A common technique is to utilize the known fact that water has a higher density than oil, and therefore it is possible to use gravity as a separating force. A common known separator arrangement is using a large tank where the fluids from the oil well are kept still for a time period. During this time period the gravity forces separate the oil and water, and the water is piled up at the bottom of the tank from where it can be removed, and gas may be piled up at the top of the tank above the oil since gas has a lower density than oil and water. Sand may also be piled up in the bottom of the tank together with the water.

It is also known more active types of separators, for example the class of separators denoted cyclone separators. The patent application EP0266348 A1 from 17 Jun. 1985 disclose a cyclone separator comprising a separating chamber (1), (2) (3); at least one inlet (8), for introducing feed to be separated into the cyclone separator and at least two outlets (4), (10), for discharging material from the separating chamber. The separator comprises at least one generally circumferential slot (20), disposed in the wall of the separating chamber downstream of each inlet slot (20), leading to or communicating with an exit from the separating chamber.

The gravitational separator tank installations are rather large and can usually only be located at centrally located places on land. Especially, in connection with oil production from the sea bed this has been regarded as an unfavourable solution. The paten publication U.S. Pat. No. 8,002,121 with priority from 15 Nov. 2004, by Michel Berard et al., addresses this problem by arranging an in-line flow separator being installable on a sea bed comprising an uphill section of a tubeline connected to a well head, where a first liquid (oil) and a second denser liquid (water) may flow through the separator from the bottom of the separator to an uphill located outlet opening. The second liquid forms a sump due to gravitation extending uphill from the bottom of the separator to an interface layer between the water and oil. An outlet in the bottom of the separator makes it possible to remove the water collected in the sump. A series of sensors are arranged in the uphill section to monitor the position of the interface layer between the water and the oil.

The international patent application WO 02/01044 by Skovholt et al. discloses an inclined gravitational separator having an inner tube arranged inside an outer tube. A tube carrying fluids from an oil well head are arranged to be in fluid communication with the inner tube via a tube joint located for example in a bottom surface of the inclined separator. The inner tube has a plurality of perforations (or holes) in the inner tube walls, and due to gravity water (and sand if present) in the fluid from the well head will fall through these openings, and will be collected in a sump in the bottom of the outer tube. The separated oil (and/or gas) will flow out of the inner tube from an opening in a top section of the separator. The pressure from the oil well drives the fluids through the separator system.

However, the plurality of openings, for example round holes, has a tendency to induce turbulence in the streaming flow out from the inner tube into the outer tube which may provide a slowing down of the flow of fluids and which may also provide an unfavourable mixing of fluid components, especially in the interface layer between water and oil. This condition can be difficult to handle if the fluid from the well head is under high pressure. Further, if the speed of the flow of fluid components in the tube is too high, the streaming of fluids past openings in the wall of the inner tube may provide a suction force due to the Venturi effect, as known to a person skilled in the art. Therefore, it is possible that the separator under certain conditions may extract (pump) water from the sump into the stream of fluids in the inner tube instead of separating for example the water from the oil. Therefore, it may be necessary to reduce the velocity of fluid streaming in the arrangement. According to the teaching of Skovholt et al. this can be achieved with valves that are controlled in a feedback loop, wherein control signals are generated proportional to signals from respective pressure transducers located in the separator, for example.

It may further be a problem that the interface layer between the water and oil in the separator may be a diffuse interface layer (no distinct border line between the fluids) and also that the interface layer may be located at different levels relative to for example the bottom of the separator. If the interface is too close to the bottom the number of openings in the inner tube walls the water may fall through due to gravitation will be less compared to a situation where the interface is higher up in the inclined separator. Therefore, the separation capacity may be variable due to for example variable flow rates.

There are also other further issues to take into consideration. For example slugs which are large volumes of liquid or gas that may appear as a unit out of different reasons and conditions in the pipelines transporting crude oil from oil wells. In known art it is common to arrange a slugcatcher that is located at the end of a pipeline and acts as a buffer to protect processing equipment. Slugs may move with higher velocities than expected fluids streaming from the oil field. The extra energy provided for by this increased velocity may then result in induced mechanical stress and shaking of the installation as known to a person skilled in the art.

Another problem with some crude oils is how water in the crude oil have impact on waxy crude oil gelation and rheology. These effects can provide obstacles to the streaming of the oil through a separator system, due to non-Newtonian behaviour of the fluids as well as gel clots that can block openings in the separator systems.

Hence, an improved oil separator would be advantageous, and in particular a more efficient and/or configurable and adaptable oil separator would be advantageous.

OBJECT OF THE INVENTION

It is a further object of the present invention to provide an alternative to the known art.

In particular, it may be seen as an object of the present invention to provide a tubular oil separator for oil well fluids that solves the above mentioned problems of the known art with a gravitational oil separator design providing improved laminar fluid flow conditions in the tubular oil separator.

SUMMARY OF THE INVENTION

Thus, the above described object and several other objects are intended to be obtained in a first aspect of the present invention by providing a tubular oil separator comprising a plurality of openings in an inner tube inside an outer tube, wherein the inner tube is closed in an upstream end of the tube, wherein the design of the plurality of openings are dependent on the oil quality to be separated.

The present invention is particularly, but not exclusively, advantageous for obtaining an inclined separator for separating oil well substances, the separator comprising an elongated outer, closed tubular section and an elongated, inner tubular section, which is closed in one end and open in another end, where the inner tubular section is arranged inside the outer tubular section, and where oil well substances are introduced into the open end of the inner tubular section via a tube feed section passing through the outer tubular section and into the inner tubular section, and where the inner tubular section comprises multiple, elongated and parallel slots arranged in a longitudinal direction of the inner tubular section in a circumferential manner, where the inclination of the separator facilitates separation of the oil well substances into lower density substances and higher density substances, where the lower density substances by buoyancy drift upward through the slots and exit via an upper outlet in the outer tubular section and higher density substances sink downward through the slots and by gravitation exit via a lower outlet in the outer tubular section.

The inclined separator hereby obtained provides a solution to the issues in the known art and according to the objects stated above. The inclination may be either upwards or downwards relative to horizontal, i.e. that a direction of flow through the inner tubular section is either upwards or downwards. The inclination angle may be selected from +5 to +60 degrees or −5 to −60 degrees. The selection of a negative angle may be advantageous if the oil well substance comprises high relative amounts of water and/or sand. A positive angle may be advantageous if the oil well substance comprises high relative amounts of gas and/or oil.

The separator may have an open end of the tube feed section including a conical section adapted for connection to the inner tubular section, and where a cross-sectional dimension of the tube feed section upstream to the conical section is smaller than a cross-sectional dimension of the inner tubular section. This conical expansion in dimension provides a slowing of the flow of the substances, which may prevent turbulence and maintain a laminar flow.

The separator may have in the inner tubular section have slots, which are circular, oval or elongated. These are preferred shapes, which decrease a possibility of turbulence as they contain no sharp corners etc., which may be used, but are less desired.

The separator may have slots, which are essentially circular and comprise lip-like gradual openings extending outwardly from the inner tubular section and ends in a tubular manner. This improves the outward flow from the slot and helps keeping the flow laminar.

The separator may have a tube feed section, which includes a curved section. This has a certain effect of layering the phases of the substance as flow speed is higher at the outside of the curve and lower at the inside of the curve, and thereby adding a centripedal effect in the curve corresponding to gravity, albeit it may be in a plane different from vertical.

The separator may have a vibrator adapted to loosen substance stuck in the inner tubular section. This is of benefit to avoid a stop for maintenance and service as the vibrator may open the flow in case of a blocking.

The separator may have an openable and closable flap located in the closed end of the inner tubular section. This may be used to flush out a slug closing part of the inner tubular section.

The inner tubular section may a cross-sectional dimension, which is at least three or at least five times larger than a cross-sectional dimension of the tube feed section. The larger the difference in dimension is between the inner tubular section and the tube feed, the more the flow is slowed down and the risk of turbulence is lowered. However, if the difference in dimension becomes too large, there is a risk that not enough flow may pass into the inner tubular section in order to fully exploit the capacity of the separator.

The multiple slots in the inner tubular section may extend in substantially an entire longitudinal length of the inner tubular section. This provides slots that are effective both for lower density phases, which may exit the inner tubular section more upstream than higher density phases, which may exit downstream relative to the lower density phases.

An opening may be provided in the closed end of the inner tubular section, and where a return tube section is connected to the opening, and when an overflow from the tube feed section of oil well substances occur, the overflow is led into the tube connection connected to the opening in the end of the inner tubular section and recirculated back into the tube feed section. This is useful when setting flow speed at running-in of the separator. The flow speed may be increased or decreased until practical no substance is overflowing.

The return tube section is preferably connected to the tube feed section by a Y-shaped connection. This may have a Venturi effect, where the flow in the tube feed sucks the overflow received from the return tube section.

The inner tubular section may be in fluid communication with an inlet opening on a side wall of the outer tubular section at a bottom section of the inclined separator, and wherein the opening is in fluid communication via a curved tube to a bottom opening of the inner tubular section. The technical effect is explained is stated in the description of FIG. 7.

The inner tubular section may be perforated with a plurality of circular shaped slots, and wherein rounded cover caps are arranged over the circularly shaped slots, and wherein openings in the rounded covering cap surfaces are arranged downstream relative to fluid flow direction in the inner tubular section. The technical effect is explained is stated in the description of FIG. 8.

Another aspect of the invention relates to a method of operating an inclined separator for separating oil well substances where the oil well substances are fed at a controlled speed from the tube feed section into the inner tubular section, and adapting the speed of the oil well substances from the tube feed section to obtain a laminar flow in the inner tubular section, in order to allow separation of the oil well substances into lower density substances and higher density substances.

Preferably, the speed of the oil well substances is adapted to allow the lower density substances by buoyancy to drift upward through the slots and exit via an upper outlet in the outer tubular section and the higher density substances to sink downward through the slots by gravitation an exit via a lower outlet in the outer tubular section.

The speed of the oil well substances may intermittently be regulated in a pulsating manner. This is in order to create a cleaning effect to the separator and in particular to the slots of the inner tubular section.

A further aspect of the invention relates to a use of an inclined separator for separating oil well substances into lower density substances, such as mainly oil and gas, and higher density substances, such as mainly water and sand.

Yet another aspect of the invention relates to a separator system for separating oil well substances, the system comprising multiple inclined separators, wherein oil well substances are introduced into the open end of one or more of the inner tubular sections of via a tube feed section passing through the outer tubular section and into the inner tubular section, where the inclination of the separator facilitates separation of the oil well substances into lower density substances and higher density substances, where the lower density substances by buoyancy drift upward through the slots and exit via an upper outlet in the outer tubular section and higher density substances sink downward through the slots and by gravitation exit via a lower outlet in the outer tubular section, and where one or more manifolds or pipe sections are arranged to connect upper outlets and lower outlets, respectively.

The respective aspects of the present invention may each be combined with any of the other aspects. These and other aspects of the invention will be apparent from and elucidated with reference to the embodiments described hereinafter.

DESCRIPTION OF THE FIGURES

The separator system according to the present invention will now be described in more detail with reference to the accompanying figures. The attached figures illustrates examples of embodiments of the present invention and is not to be construed as being limiting to other possible embodiments falling within the scope of the attached claim set.

FIGS. 1-6A illustrate examples of embodiment according to the present invention.

DETAILED DESCRIPTION OF AN EMBODIMENT

Figure 1:
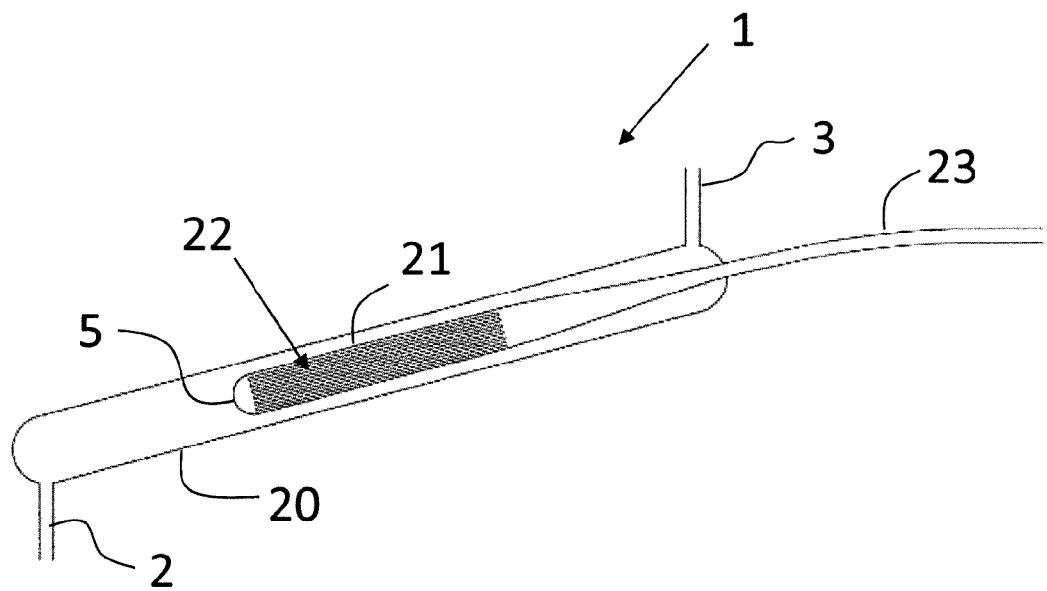

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

Oil from on shore as well as off shore oil fields are usually a mixture of gas, oil, water and sand and possible other components as known in the art. The fluid components are often referred to as phases. Separation of the phases are done in separation systems denoted two phase separators, three phase separators or four phase separators etc., wherein the number of phases indicate how many phases that are actually separated. The content of the respective components or phases of the oil can vary dramatically and therefore it is not always necessary to have an expensive four phase separator installed.

It is further different oil qualities that can provide different aspects of a separator design. The age of the oil can indicate the quality where younger crude oils usually have lower quality. Another important parameter is the viscosity of the oil, or the resistance to flow, that directly may influence the separator design. Crude oils with higher viscosity has a slower flow. There is also a variation in the amount and types of paraffin that can be present in the crude oil, for example straight-chain paraffins, branched-chain paraffins, aromatics and naphtalenes. Long molecule chains of paraffins are wax compounds.

An example of severe problems related to crude oil quality is the Lasmo oil field in the United Kingdom. This oil field was closed because of recurring paraffin plugging problems.

The temperature of the crude oil can influence different aspects of oil qualities. If the temperature of the oil is below the pour point (PP point) the oil fluid exhibits highly non-Newtonian behaviour and gel formation may occur. Above the so called cloud point (WAT point) it is common that the oil fluid is a Newtonian fluid and wax deposition is for example minimal. Between the PP and the WAT point there is a mixture of non-Newtonian and Newtonian behaviour of the crude oil. The temperature of the oil from a reservoir can vary as well as the degree of cooling of the crude oil that can happen when the oil is transported in for example pipe lines on the ground or seabed.

When designing an oil separator the viscosity of the oil and the crude oil gelation and rheology may require designs that are more or less incompatible. If a design is suitable for crude oils with high viscosity the same design can prove to be non working for crude oils with lower viscosity. Therefore, some adaptation of oil fluid separator designs to the crude oil quality seems to be necessary.

Figure 2:
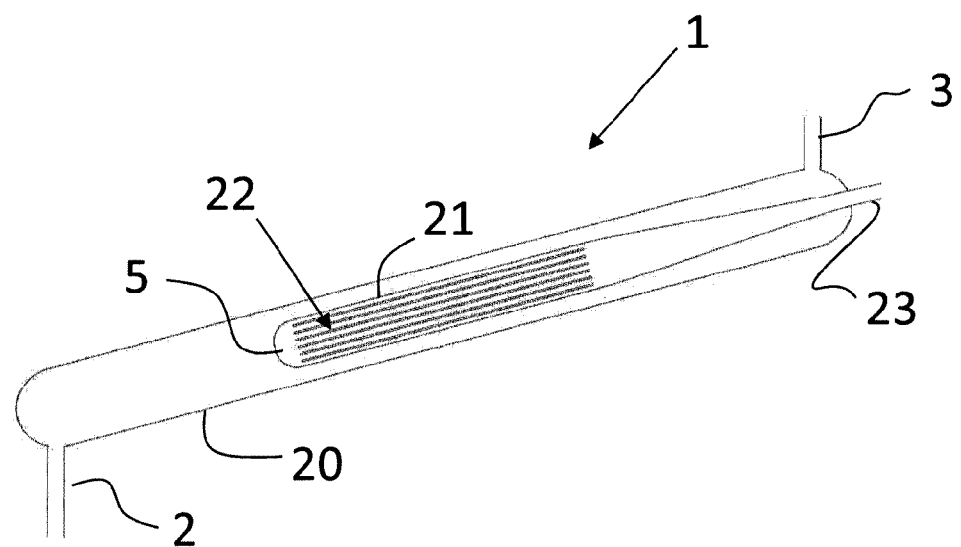

FIGS. 1 and 2 illustrate examples of embodiments of a separator 1, where the inclination is negative, and where the oil mixture will continue inside an inner tube 21 that expands in width from the inlet 23 to the final width of the inner tube section 21. The conical shaping of the tube inlet of the inner tube section 21 of the tube provides a decreasing of the oil fluid velocity (Venturi effect) before the oil fluid mixtures are operationally coming in contact with the plurality of smaller round slots (openings or holes) 22 in the wall of the inner tube section 21. The example of assembly of holes 22 as illustrated in FIG. 1 is functioning like a sieve and since the inner tube section 21 is arranged with a closed end cap 8 opposite the inlet 23, all fluids coming through the separator can only pass the arranged openings or sieve 22 when passing out into the outer tube section 20. The arrangement of the end cap 8 together with the arranged openings in the wall of the inner tube section 21 provides a separation between fluid volumes respectively located in the inner tube section 21 and the outer tube section 20. The fluid velocity is reduced due to the conical shaping of the inlet of the inner tube section 21, but it will still be a build up of fluids in the volume of the inner tube section 21. Therefore, there will be a slight pressure gradient across the arranged openings 22 of the wall of the inner tube section 21. Therefore, the oil fluids will pass from the inner tube section 21 out to the outer tube section 20. From the outer tube section higher density substances will exit through a lower outlet 2 and lower density substances will exit through a higher outlet 3, whereby a separation of the substances are obtained. FIG. 2 illustrates an example of embodiment of a separator 1 comparable to FIG. 1, where the slots 22 are larger.

This is in contrast to the example of known art illustrated in WO 02/01044, where the speed of the oil passing the openings in an inner tube section may provide a suction due to the Venture effect that will be present. In this manner it is possible that water that normally should flow out of the outlet in the bottom section of the separator can be pumped back into the oil that is flowing out of the upper outlet.

With reference to the above disclosed problem with slugs in pipelines, a slug breaker may be arranged as a part of a pipeline system that dissipates the energy of slugs that intermittently occur and which may temporarily store any excess material for later processing. If a slug is coming through the inlet opening of an example of embodiment of the present invention, the end cap 8 of the present invention, as illustrated in FIG. 1, may serve as a slug breaker that will stop slugs inside the inner tube section 21 thereby providing a possible separation of slug components as well as the normal crude oil through the walls of the inner tube section 21. Further, the arrangement of an assembly of openings 22 like a sieve arrangement for example, will provide some dissipation of the energy of the slug.

In the known art solution shown in WO 02/01044, slugs passes more or less unobstructed out of the intended outlet openings arranged respectively for water and oil (and/or gas) in the separator, and the slug may pass through to processing equipment upstreams thereby posing a risk of harming the ongoing processing of the oil fluids from a well.

Figure 3:
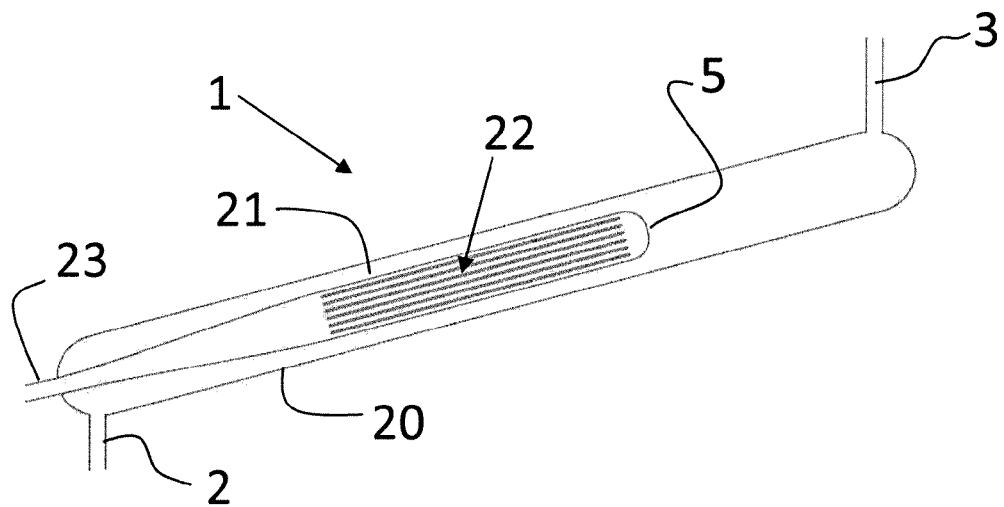
Figure 4:
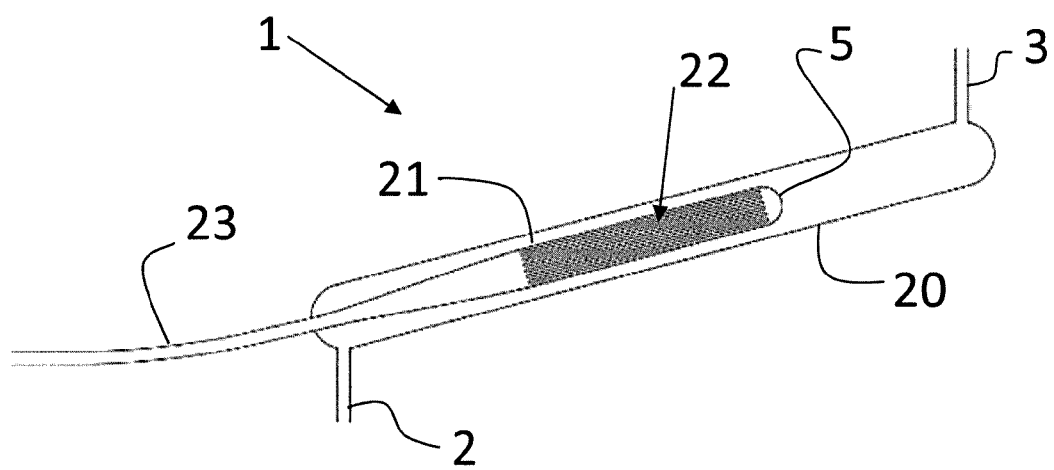
Figure 5:
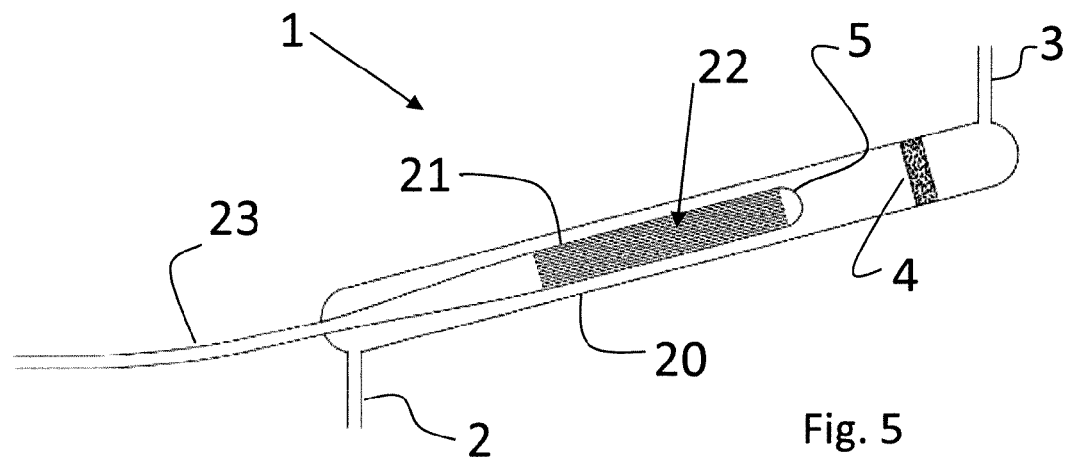
Figure 6A:
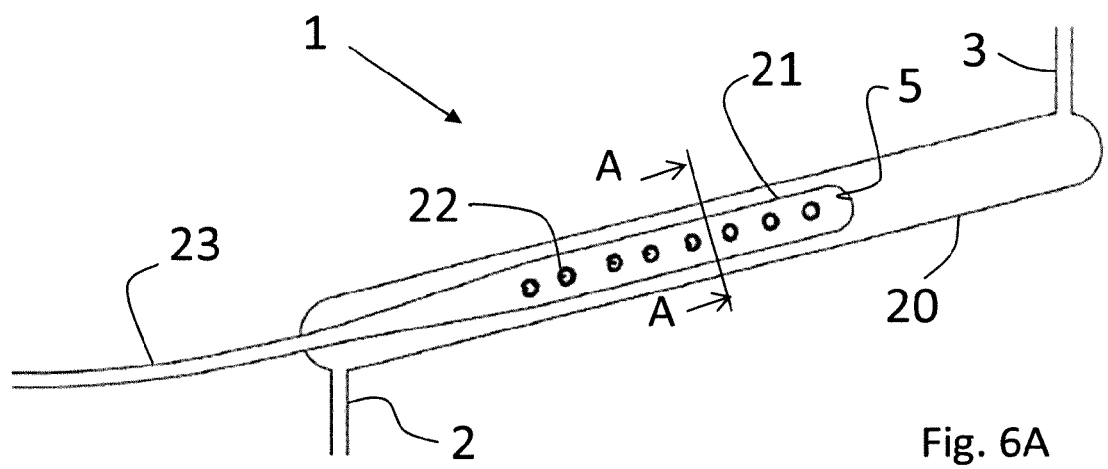
Figure 6B:
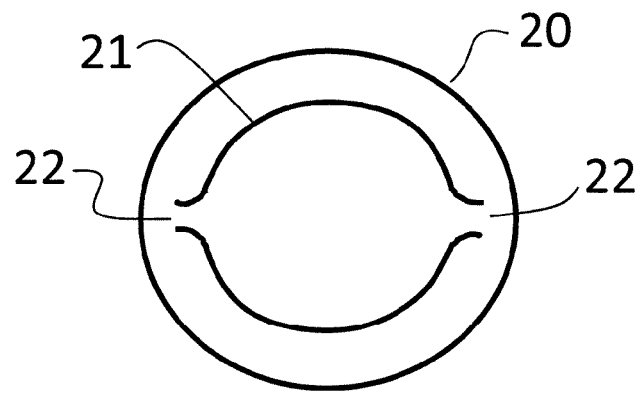
FIG. 6B illustrates section A-A of FIG. 6A.

FIGS. 3, 4, 5 and 6A illustrate other embodiments of a separator 1 having a positive inclination. Here the oil mixture will continue inside an inner tube 21 that expands in width from the inlet 23 to the final width of the inner tube section 21. The conical shaping of the tube inlet of the inner tube section 21 of the tube provides a decreasing of the oil fluid velocity (Venturi effect) before the oil fluid mixtures are operationally coming in contact with the plurality of smaller round slots (openings or holes) 22 in the wall of the inner tube section 21. The examples of assembly of holes 22 as illustrated in FIGS. 3-6A are functioning to gradually let separated substances flow through the slots to cause a separation. The inner tube section 21 is arranged with a closed end cap 8 opposite the inlet 23, all fluids coming through the separator can only pass the arranged openings or sieve 22 when passing out into the outer tube section 20. The arrangement of the end cap 28 together with the arranged openings in the wall of the inner tube section 21 provides a separation between fluid volumes respectively located in the inner tube section 21 and the outer tube section 20. The fluid velocity is reduced due to the conical shaping of the inlet of the inner tube section 21, but it will still be a build up of fluids in the volume of the inner tube section 21. Therefore, there will be a slight pressure gradient across the arranged openings 22 of the wall of the inner tube section 21. Therefore, the oil fluids will pass from the inner tube section 21 out to the outer tube section 20. From the outer tube section higher density substances will exit through a lower outlet 2 and lower density substances will exit through a higher outlet 3, whereby a separation of the substances are obtained. FIG. 3 illustrates an example of embodiment of a separator 1 having relatively large slots 22. FIG. 4 illustrates an example of embodiment of a separator 1 having relatively small slots 22. In FIG. 5 the slots are elongated to form sleeves. Also a filter 4 is shown in FIG. 5. The filter may obstruct gas droplets, so that they may dissolve gradually. In FIG. 6A shows an embodiment with relatively few, but relatively large slots, which are further illustrated in FIG. 6B showing a lip-like gradual opening 5 in a tubular manner.

Figure 7:
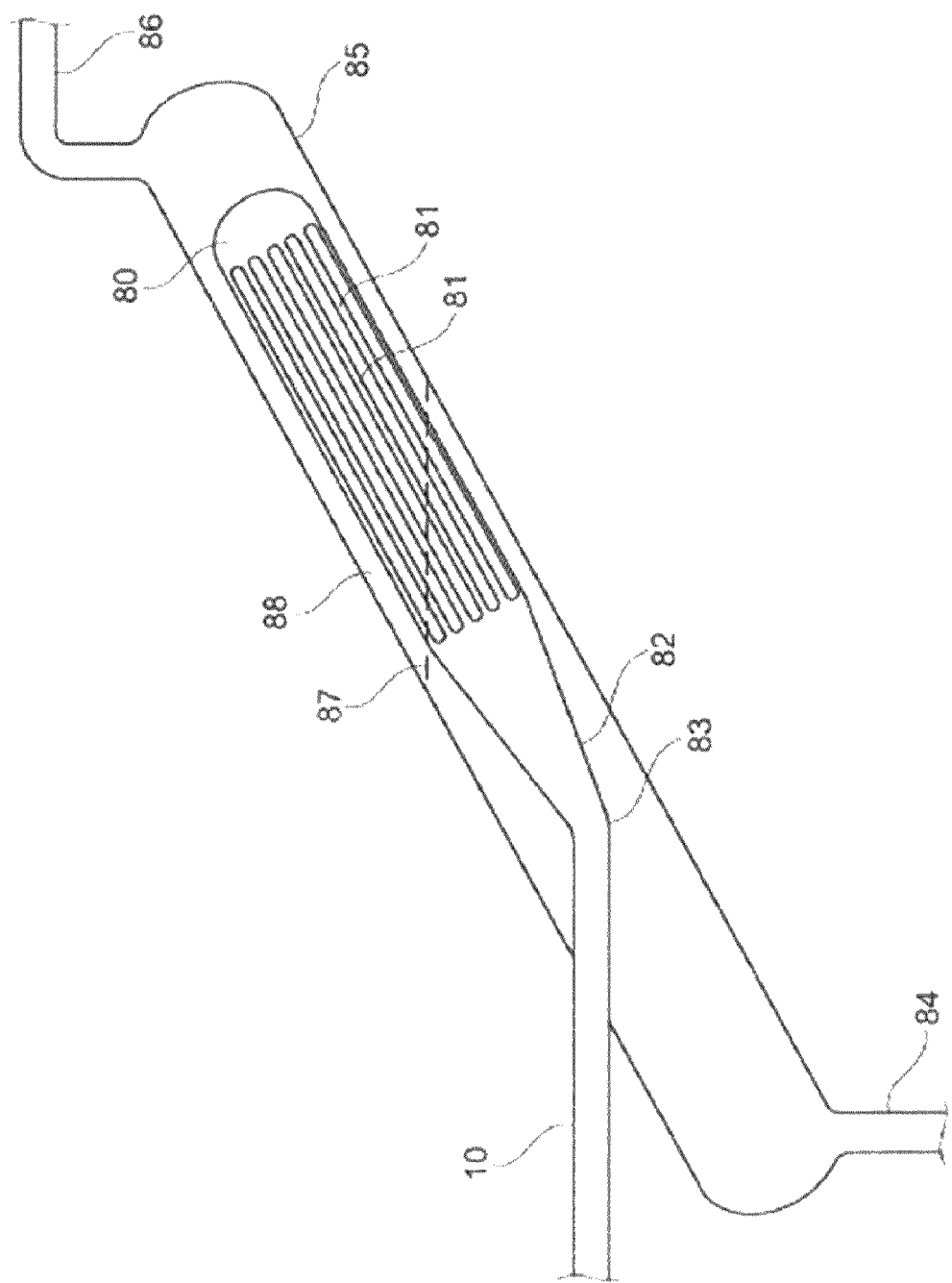
FIG. 7 illustrates another example of embodiment according to the present invention.

In an example of embodiment of the present invention as depicted in FIG. 7, an example of a separator comprises an inclined separator tube section with an inner tube 80 located centred inside an outer tube 85, wherein the inner tube is in fluid communication with the input manifold section via an inlet opening on a side wall of the outer tube at a bottom section of the inclined separator tube section, wherein the opening is in fluid communication via a curved tube 83 to a bottom surface of the inner tube located inside the outer tube, wherein the bottom surface 82 of the inner tube is arranged with a conical shape, wherein a section with smaller radius of the cone shape is connected to the curved tube while a section with a larger radius of the cone is connected to the inner tube, walls of the inner tube is perforated with a plurality of parallel and elongated slots 81, and the inner tube is terminated and closed in a section located at a top section of the inclined separator tube section, the outer tube has a first outlet opening 86 arranged in the top section and a second outlet opening 84 arranged in the bottom section of the inclined separator tube section. The curved tube 83 provides a small cyclone effect separating oil and water in two layers before the mixed fluid enter the conical shaped part 82. The conical shape will reduce the speed of the fluid before passing the elongated slots 81. The elongated slots 81 are providing less turbulence in the fluids compared to traditional perforations as known in the art. Further, the possible suction problem as described in known art is eliminated with this design because of the slots since the directions of the slots are in the flow direction of the fluids.

Figure 8:
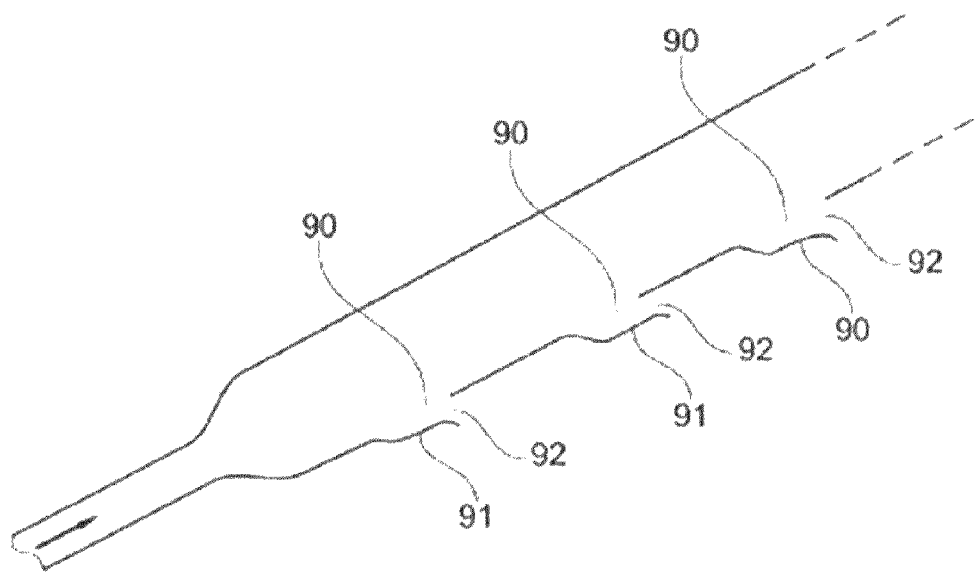
FIG. 8 illustrates a cross section of an example of a separator according to the present invention.

According to another example of embodiment of the present invention as depicted in FIG. 8, the walls of the inner tube is optionally perforated with a plurality of circular shaped openings 90, wherein rounded cover caps 91 are arranged over the circular shaped openings, and wherein an opening 92 in the rounded covering cap surfaces are arranged downstream relative to fluid flow direction in the inner tube, and wherein the opening in the rounded cap surfaces constitutes a surface being perpendicular to the side walls of the inner tube. With this arrangement the openings of the circular shaped openings will not experience a streaming of fluids passing the openings and thereby providing a suction force due to the Venturi effect. Further, the openings together with the covering caps provide an increase in the diameter of the tube over the opening area thereby reducing the speed of fluids passing the openings. This will enable increased separation efficiency. The smooth shaping of the covering cap surfaces provides a guiding of fluids along the smooth cap surfaces due to the Coanda effect. The resulting effect is that there is a reduced risk of turbulence in the streaming of fluids due to the openings.

Oil from on shore as well as off shore oil fields are usually a mixture of gas, oil, water and sand etc. The fluid components are often referred to as phases. Separation of the phases are done in separation systems denoted two phase separators, three phase separators or four phase separators etc., wherein the number of phases indicate how many phases that are actually separated. The content of the respective components or phases of the oil can vary dramatically and therefore it is not always necessary to have an expensive four phase separator installed. However, if the water content is low at the beginning of production from an oil well it is common known that the content of water increases after a while. This is due to for example features of the geology in the oil containing formation. For example, the pressure inside the oil formation may be lower after a period of production enabling inflow of water from surrounding formations.

Processing of fluids in other processing stages, or at other locations, may dictate the number of separated phases that are needed. The composition and respective percentage fraction of volume of gas, oil, water and sand etc. will vary from the start of production towards the end of production from an oil well. Further, it should also be possible to provide different separation schemes with respect to how many components or phases that it is intended to be separated during different stages of the production lifetime of an oil well. For example, an oil and gas mixture can be separated from water which implies a two phase separator. Another example can be separation of an oil and sand mixture from separated gas and separated water, which implies a three phase separator. All the fluid phases may also be separated which implies for example a four phase separator. In addition, the volume of each phase or fluid component in the fluid mixture will influence the capacity of the system with respect to the separator sections handling each respective fluid component. It is also beneficial to be able to configure which fluid phases that should remain together after passing the separator system if not all phases are separated, for example oil and water, oil and gas etc.

Further, it may be advantageous to be able to combine separation sections based on different physical separation principles, for example cyclone separators and/or gravitational separators in an optimized configuration.

Figure 9:
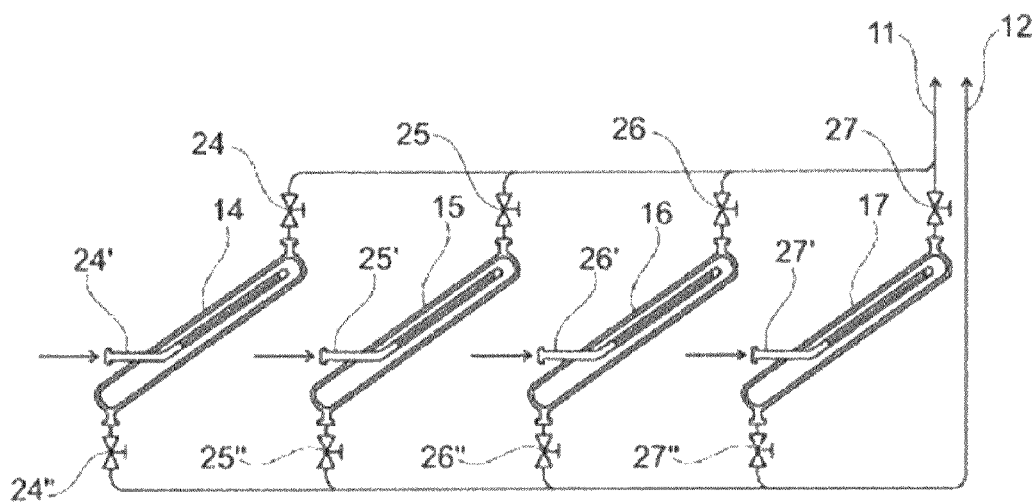
FIGS. 9-15 illustrates examples of a separator system according to the present invention.

FIG. 9 illustrate an example of configuration of a system having four separators according to the present invention, wherein the fluid from an oil well is distributed in parallel by an input manifold section (not shown) to each respective inlet opening 24', 25', 26', 27', of each respective inclined separator section 14, 15, 16, 17. The outlet openings 24, 25, 26, 27 located in the top section of the inclined separators are collected in one outlet pipe 11 an output manifold section (not shown). The outlet openings 24", 25", 26", 27" in the bottom sections of the respective separator sections are collected by a pipe section and an output manifold sections (not shown) to a second outlet pipe 12. The volume of gas may be large while the volume of oil and water is moderate. In this configuration gas is separated from oil mixed with water and sand (two phase separation). The flow out of each separator is controlled by adjustable choke valves placed at the outlet openings 24, 25, 26, 24", 25", 26", 27".

The separators may have different inclinations (not shown), as e.g. that fluid with a high gas content, that the gas may be separated more efficiently with a relatively high positive inclination.

Figure 10:
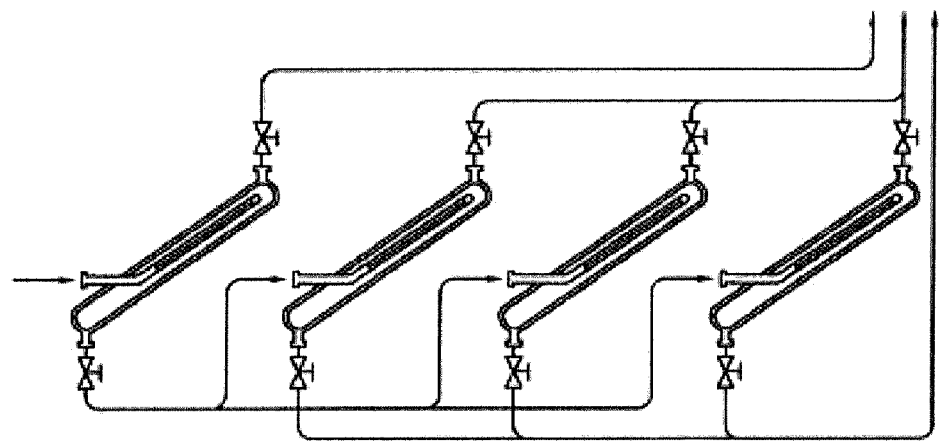

FIG. 10 depicts an example of configuration according to the present invention adaptable to an oil field with moderate volume of gas located in deep waters. The volume of gas is moderate, the volume of oils is large and the volume of water and sand is moderate. The first separator (viewed from the left in the figure) separate gas from the oil mixed with water and sand. The mixture of oil, water and sand from the first separator is then separated in a parallel arrangement between the second, third and fourth separator. The output from the second, third and fourth separator is the oil and a mixture of water and sand. This configuration is a two phase separator.

Figure 11:
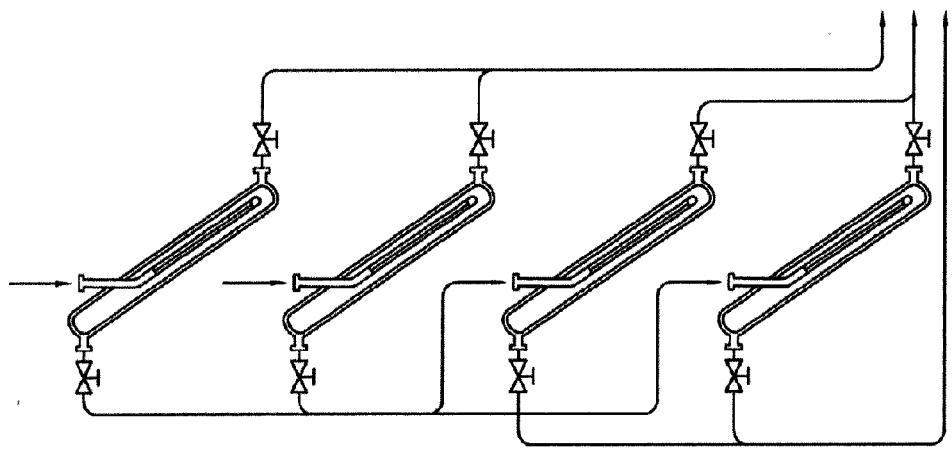

FIG. 11 is a configuration with a large volume of gas and moderate volume of oil, water and sand. The gas is separated from the oil and, water and sand mixture in two parallel separator section arrangements. This configuration is a two phase separator.

Figure 12:
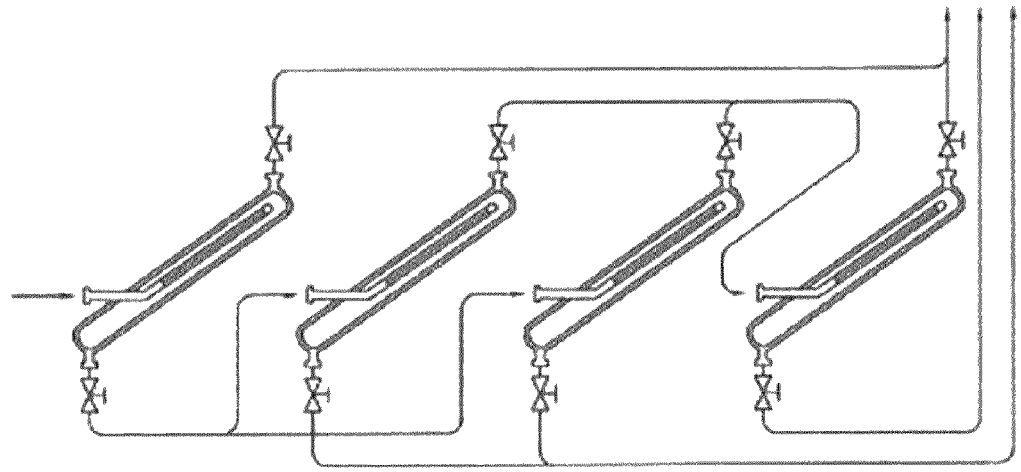

FIG. 12 depicts an example of configuration adapted to an oil field with low volume of gas, moderate volume of oil and large volume of water and sand. The oil is separated from a mixture of water and sand, and the water is separated from the sand in two parallel separator sections (three phase separation). The first separator (viewed from the left in the figure) separates the oil while the two next separator sections separate the sand in parallel from the water and sand mixture from the first separator. The remaining water and oil from these two separators are then separated in the last separator section. The last separator separates the water. This is a three phase separator.

Figure 13:
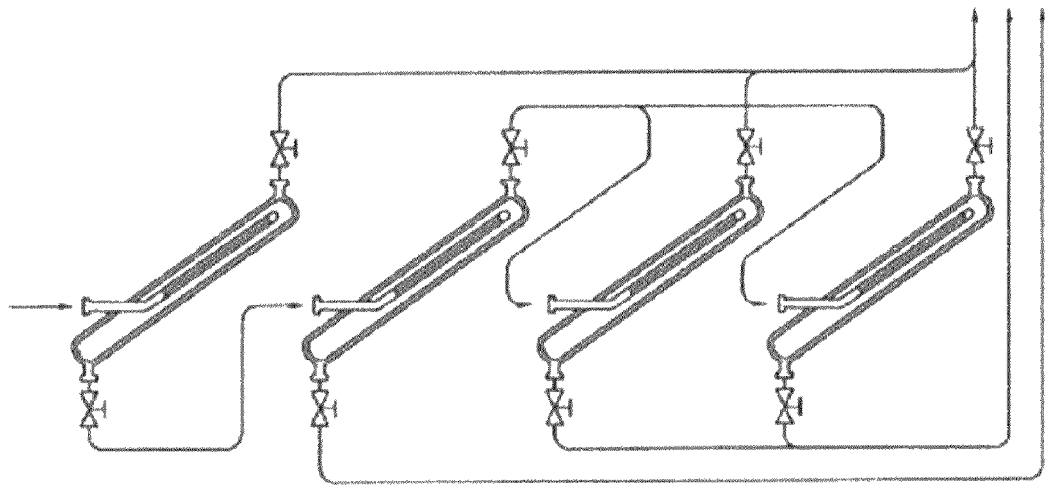

FIG. 13 depict a configuration suitable for a oil field with low volume of gas, moderate volume of oil and large volumes of water and sand as in the example depicted in FIG. 12. However, in this example of configuration there is a parallel separator arrangement for the water separation. This is a three phase separator.

Figure 14:
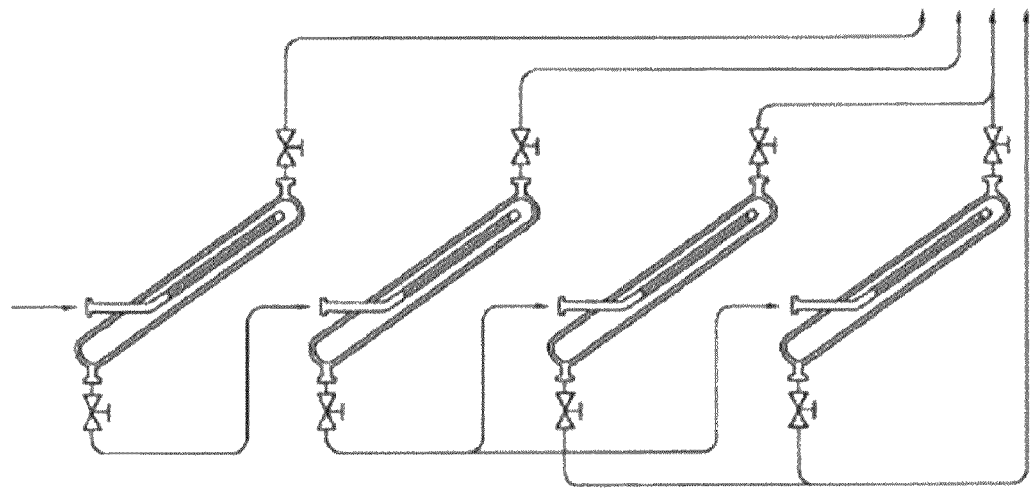
Figure 15:
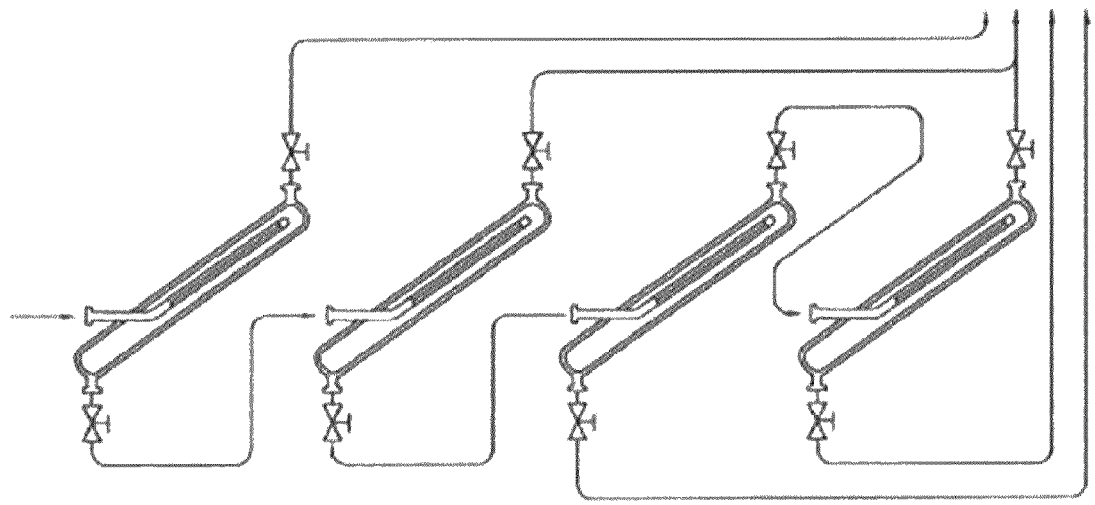

FIGS. 14 and 15 illustrate additional possible configurations of the system according to the present invention.

Figure 16:
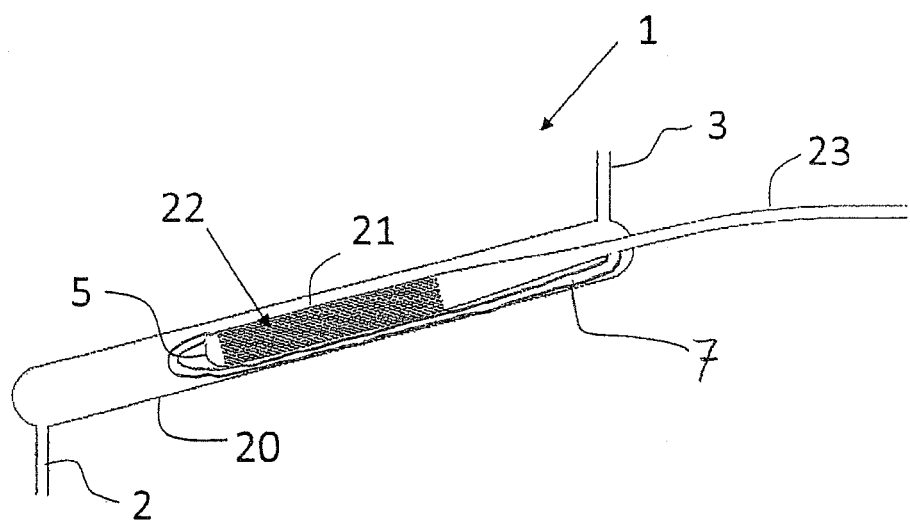
FIG. 16 illustrates another embodiment of a separator system including a return line section.

FIG. 16 illustrates an additional possible configuration of the system according to the disclosure. As shown, a return tube 7 is connected to an opening in the closed end 5 of the inner tube section. The return tube section 7 is connected on its other end to the tube feed section 23. The return tube section 7 is arranged for leading overflow of the inner tubular section 21 back into the tube feed section 23. As shown, the return tube section 7 connects to the tube feed section 23 via a Y-shaped connection.

The actual configuration of a separator 1 or a system of separators may only be found be collecting empiric data. There is at present no analytical model available to determine the configuration. This pertains to separators and systems of separators for oil wells providing very different substances, such a having variable viscosity, density, amounts of gas, oil, water and sand as well as to changes in these parameters over time in one oil well. Only hints may be given, such as low viscosity requires many small slots, whereas high viscosity requires fewer and larger slots. Also, the speed of flow is an important parameters, as high speed increases a risk of turbulence. Moreover, the length and diameter of the separator influences affiance and capacity of the separator. With a longer separator, the phases have, given that the flow speed is constant, more time to separate as it will travel longer in the inner tubular section and stays longer in the outer tubular section. The diameter of the inner section influences, at least in part, how far phases in the central part of the inner tubular section need to travel in order to exit through the slots. The diameter of the outer tubular section influences, at least in part, the time the separated phases have in the outer tubular section to refine the separation.

The phase separation of paraffinic solids from crude oil constitutes a major operating issue for the petroleum industry, in view of the fact that the association of wax crystals into a disordered spanning network can lead to severe flow assurance problems. Although the presence of water in crude oil is quite common, its impact on waxy crude oil gelation and rheology has not received much more attention in the literature.

A presence of water above a threshold value can greatly enhance gel formation, changing both the pour point temperature and the yield strength. The rheological characteristics of crude oils show both above and below the gel point and a qualitative interpretation of the structure of waxy crude oil gels in the presence of water is.

This suggest that the impact of emulsified water on pour point and gel rheology needs to be added to the standard tests conducted on crude oils during field development studies, particularly for those offshore developments with multiphase production in order to optimize separator configurations.

EXAMPLE

A preferred embodiment of a separator according to the invention has an inclination of −15 degrees (minus fifteen degrees). The embodiment is based on the following fluid characteristics:
  75% water content
  Inlet flow speed 1 m/s
  Inner pipe flow speed below 0.11 m/s
  Light fluid speed below 0.01 m/s
  Light fluid retention time at least 250 seconds
  Heavy fluid flow speed below 0.03 m/s
  Heavy fluid retention time at least 80 seconds
  For these characteristics the following design is chosen:
  Overall length of separator, 8 m
  Inlet diameter, 0.15 m
  Conical section of inner tube, length 2.5 m starting with inlet from upper end of outer tube
  Inner tube closed at lower end with a cap, length 3 m, diameter 0.45 m
  Slotted section of inner tube, 80% of inner tube length
  Slots, elongated sleeves, parallel, 0.01 m width, 0.01 m spacing, over whole circumference of inner tube
  Outer tube, length 8 m, diameter 0.75 m
  Fluid outlets at top and bottom end of outer tube, diameter 0.15 m

The invention claimed is:

1. An inclined separator (1, 14, 15, 16, 17) for separating oil well substances, the separator (1, 14, 15, 16, 17) comprising:
  an elongated outer, closed tubular section (20, 85) and an elongated, inner tubular section (21, 80) arranged inside the elongated outer tubular section (20, 85), where both the elongated outer, closed tubular section (20, 85) and the elongated, inner tubular section (21, 80) are inclined either upwards or downwards relative to a horizontal plane;
  the elongated, inner tubular section (21, 80) is closed in one end by an end cap (5), working as a slug breaker, and open in another end for connection to a tube feed section (10, 23) via a conical expansion between the tube feed section (10, 23) and the inner tube section (21, 80);
  the tube feed section (23, 10) passes through the outer tubular section (20, 85) and into the inner tubular section (10, 23) to introduce oil well substances into the open end of the inner tubular section (21, 80);
  the inner tubular section (21, 80) comprises multiple slots (22, 81, 90) arranged in a longitudinal direction of the inner tubular section (21, 80) in a circumferential manner;
  the inclination of the separator (1, 14, 15, 16, 17) facilitates separation of the oil well substances into lower density substances and higher density substances; and
  the lower density substances drift upward by buoyancy through the slots (22, 81, 90) and exit via an upper outlet (3, 86) in the outer tubular section (20, 85) and the higher density substances sink downward by gravity through the slots (22, 81, 90) and exit via a lower outlet (2, 84) in the outer tubular section (20, 85) and the direction of flow in the inner tubular section (21, 80) is either upwards or downwards.

2. The inclined separator according to claim 1, wherein a cross-sectional dimension of the tube feed section (10, 23) upstream of the conical expansion is smaller than a cross-sectional dimension of the inner tubular section (21, 80).

3. The inclined separator according to claim 1, wherein the slots (22, 81, 90) are circular, oval, or elongated.

4. The inclined separator according to claim 1, wherein the slots (90) are essentially circular and comprise lip-like gradual openings extending outwardly from the inner tubular section (21, 80) and end in a tubular manner.

5. The inclined separator according to claim 1, wherein the tube feed section (10) includes a curved section (83).

6. The inclined separator according to claim 1, where the separator (1, 14, 15, 16, 17) includes a vibrator adapted to loosen substance stuck in the inner tubular section (21, 80).

7. The inclined separator according to claim 1, where the separator (1, 14, 15, 16, 17) includes an openable and closable flap located in the closed end of the inner tubular section (21, 80).

8. The inclined separator according to claim 1, where the inner tubular section (21, 80) has a cross-sectional dimension, which is at least three times larger than a cross-sectional dimension of the tube feed section (10, 23).

9. The inclined separator according to claim 1, where the outer tubular section (21, 85) has a cross-sectional dimension, which is at least five times larger than a cross-sectional dimension of the tube feed section (10, 23).

10. The inclined separator according to claim 1, where the multiple slots (22, 81, 90) in the inner tubular section (21, 80) extend substantially in an entire longitudinal length of the inner tubular section (21, 80).

11. The inclined separator according to claim 1, where an opening is provided in the closed end of the inner tubular section (21, 80), and where a return tube section (7) is connected to the opening of the closed end, wherein the return tube section in the other end thereof is connected to the tube feed section (10, 23), wherein the return tube section (10, 23) is arranged for leading overflow of the inner tubular section (21, 80) back into the tube feed section (10, 23).

12. The inclined separator according to claim 11, where the return tube section (7) is connected to the tube feed (10, 23) section by a Y-shaped connection.

13. The inclined separator according to claim 11, wherein the inner tubular section (21, 80) is in fluid communication with an inlet opening on a side wall of the outer tubular section (20, 85) at a bottom section of the inclined separator (1, 14, 15, 16, 17), and wherein the opening is in fluid communication via a curved tube to a bottom opening of the inner tubular section (21, 80).

14. The inclined separator according to claim 11, wherein the inner tubular section (21, 80) is perforated with a plurality of circular shaped slots (90), and wherein rounded cover caps (91) are arranged over the circularly shaped slots (90), and wherein openings (92) in the rounded covering cap (91) surfaces are arranged downstream relative to fluid flow direction in the inner tubular section (21, 80).

15. The inclined separator according to claim 1, wherein the inner tubular section (21, 80) is in fluid communication with an inlet opening on a side wall of the outer tubular section (20, 85) at a bottom section of the inclined separator (1, 14, 15, 16, 17), and wherein the opening is in fluid communication via a curved tube to a bottom opening of the inner tubular section (21, 80).

16. The inclined separator according to claim 1, wherein the inner tubular section (21, 80) is perforated with a plurality of circular shaped slots (90), and wherein rounded cover caps (91) are arranged over the circularly shaped slots (90), and wherein openings (92) in the rounded covering cap (91) surfaces are arranged downstream relative to fluid flow direction in the inner tubular section (21, 80).

17. A method of operating an inclined separator for separating oil well substances according to claim 1 comprising, feeding the oil well substances at a controlled speed from the tube feed section (10, 23) into the inner tubular section (21, 80) and adapting the speed of the oil well substances from the tube feed section (10, 23) to obtain a laminar flow in the inner tubular section (21, 80) to allow separation of the oil well substances into lower density substances and higher density substances.

18. The method according to claim 17, further comprising adapting the speed of the oil well substances to allow the lower density substances to drift upward by buoyancy through the slots (22, 81, 90) and exit via an upper outlet (2, 84) in the outer tubular section and the higher density substances to sink downward by gravity through the slots (22, 81, 90) and exit via a lower outlet (3, 86) in the outer tubular section (20, 85).

19. A separator system for separating oil well substances, the system comprising multiple inclined separators according to claim 1, wherein oil well substances are introduced into the open end of one or more of the inner tubular sections via a tube feed section passing through the outer tubular section and into the inner tubular section, where the inclination of the separator facilitates separation of the oil well substances into lower density substances and higher density substances, where the lower density substances drift upward by buoyancy through the slots and exit via an upper outlet in the outer tubular section and higher density substances sink downward by gravity through the slots and exit via a lower outlet in the outer tubular section, and where one or more manifolds or pipe sections are arranged to connect upper outlets and lower outlets, respectively.

20. The inclined separator of claim 1, wherein an angle of inclination of the elongated outer closed tubular section (20, 85) and the elongated inner tubular section (21, 80) can be adjusted.

21. The inclined separator of claim 20, wherein the angle of inclination of the elongated outer closed tubular section (20, 85) and the elongated inner tubular section (21, 80) can be adjusted between approximately 5 and approximately 60 degrees in either direction relative to a horizontal plane.

* * * * *